US006012030A

United States Patent [19]
French-St. George et al.

[11] Patent Number: 6,012,030
[45] Date of Patent: Jan. 4, 2000

[54] MANAGEMENT OF SPEECH AND AUDIO PROMPTS IN MULTIMODAL INTERFACES

[75] Inventors: Marilyn French-St. George, Alcove; Nicola Fumai, Montreal; Henry Adam Pasternack, Ville St. Laurent, all of Canada

[73] Assignee: Nortel Networks Corporation, Montreal, Canada

[21] Appl. No.: 09/062,970

[22] Filed: Apr. 21, 1998

[51] Int. Cl.[7] .................................................. G10L 5/00
[52] U.S. Cl. ............................................ 704/275; 704/270
[58] Field of Search .................................... 704/270, 275

[56] References Cited

U.S. PATENT DOCUMENTS 5,632,002   5/1997   Hashimoto et al. ..................... 704/231

OTHER PUBLICATIONS

Jian Wang, et al. "Integration of Eye–gaze, Voice and Manual Reponsse in Multimodal User Interface," Proc. IEEE ICSMC, vol.5, pp. 3938–3942, Oct. 1995.

M. Billinghurst, et al. "Adding Intelligence to the Interface," Proc. IEEE VRAIS '96, pp. 168–175, Mar. 1996.

Rajeev Sharma, et al. "Toward Multimodal Human–Computer Interface," Proc. IEEE, vol. 86, No. 5, pp. 853–869, May 1998.

Ben Salem, et al. "Current Trends In Multimodal Input Recognition," Proc. IEE CVRPMPA (Ref. No. 1998/454). pp. 3/1–3/6, Oct. 1998.

*Primary Examiner*—David R. Hudspeth
*Assistant Examiner*—Tālivaldis Ivars Šmits
*Attorney, Agent, or Firm*—Angela C. de Wilton

[57] ABSTRACT

Management of speech and audio prompts, and interface presence, in multimodal user interfaces is provided. A communications device having a multimodal user interface including a speech interface, and a non-speech interface, e.g. a graphical or tactile user interface, comprises means for dynamically switching between a background state of the speech interface and a foreground state of the speech interface in accordance with a users input modality choice. Preferably, in the foreground state speech prompts and speech based error recovery are fully implemented and in a background state speech prompts are replaced by earcons, and no speech based error recovery is implemented. Thus there is provided a device which automatically subdue the speech prompts when a user selects a non-speech input/output mechanism. Also provided is a method for dynamic adjustment of audio prompts and speech prompts by switching from a foreground state to a background state of a speech interface in response to a users current interaction modality, by selecting alternative states for speech and audio interfaces that represent users needs for speech prompts. This type of system and method is particularly useful and applicable to hand held Internet access communication devices.

35 Claims, 10 Drawing Sheets

City/State hi-level: City/State hi-level: Prompt for i/p

Select prompts based on layer
Layers are:
identify service
identify city/state
identify business category
display business name also load appropriate vocabulary lists

MANAGEMENT OF SPEECH AND AUDIO PROMPTS IN MULTIMODAL INTERFACES

RELATED APPLICATIONS

This application is related to U.S. patent application Ser. No. 09/062,969 entitled "Server for handling multimodal information" to H. Pasternak et al.; and allowed U.S. patent application Ser. No. 09/063,007 entitled 'Communication System User Interface with Animated Representation of Time Remaining for Input to Recognizer' to M. French St. George, filed concurrently herewith.

FIELD OF THE INVENTION

This invention relates to management of speech and audio prompts in multimodal interfaces for communications systems and devices, with particular application of management of speech prompt presence of a speech interface for accessing a speech recognizer.

BACKGROUND OF THE INVENTION

Speech prompted interfaces have been used in telecommunications systems in contexts where there is no visual display or the user is unable to use a visual displays. Typically, a speech interface prompts the user when to speak by providing a speech prompt, i.e. a recognisable phrase or question prompting for user input, or by emitting a 'speak now' beep, i.e. an earcon. After the prompt, a speech recognizer is turned on for a limited time window, typically a few seconds, during which time the user may respond.

Telecommunications systems with a speech recognition capability have been in use for some time for performing basic tasks such as directory dialling. There are also network based speech recognition servers that deliver speech enabled directory dialling to any telephone. Typically, when these systems also offer a graphical user interface, i.e. a visual display, with a speech interface, in addition to a conventional tactile interface, i.e. a keypad, interfaces are discrete and non-integrated. That is, the system does not allow user tactile input and speech input at the same time.

Computer users have long been used to inputting data using a keyboard or drawing tablet, and receiving output in graphical form, i.e. visual information from a screen display which may include, full motion, colour displays with supporting auditory 'beeps'. Speech processors for computers are now available with speech recognizers for receiving speech input, and converting to text, and speech processors for providing speech output. Typically, the speech processing is embedded within an application which is turned on and off by the user as required.

Speech output and speech recognition capability are being added to a variety of other electronic devices. Devices may be provided with tactile interfaces in addition to, or instead of, conventional keypads for inputting data. For example, there are a number of hand-held devices, e.g. personal organisers, that support pen input, for writing a touch sensitive area of a display, and cellular phones may have touch-sensitive displays as well as a regular numeric keypad.

To overcome the inconvenience of switching between discrete applications offering different modes of interaction, systems are being developed to handle more than one type of interface, i.e. more than one mode of input and output simultaneously. In the following description the term input/output modality refers to a sensory modality relating to a user's behaviour in interacting with the system, i.e. by using auditory, tactile and visual senses. Input/output modes refer to specific examples of use of these modalities. For example speech and audio input/output represent an auditory modality; use of a keypad, pen, and touch sensitive buttons represent a tactile input modality, and viewing a graphical display relies on the visual modality.

An example of a multimodal interface is described in copending U.S. application Ser. No. 08/992,630 entitled "Multimodal User Interface", filed Dec. 18, 1997, to Smith and Beaton, which is incorporated herein by reference. This application discloses a multi-modal user interface to provide a telecommunications system and methods to facilitate multiple modes of interfacing with users for example, using voice, hard keys, touch sensitive soft key input, and pen input. This system provides, e.g. for voice or key input of data, and for graphical and speech data output. The user may choose to use the most convenient mode of interaction with the system and the system responds to input from all modes.

While interfaces for communications devices and computer systems are becoming increasingly able to accept input and provide output through various sensory modalities, existing systems and devices present some problems when the user tries to use particular input/output modalities according to the task at hand.

In using such an interface, for example, a user might request an item using speech, and then be presented with a list of choices on the screen, that requires some scrolling to access the relevant section of the list. At this point the user may choose to touch the scroll control and then touch an item on the list that they require.

Ideally the user wants to smoothly transition from one type of input/output modality to another, e.g. from a primarily speech input/output to a graphical and touch control structure. However there are problems with providing this transition in practice because there is an intrinsic conflict between speech interaction and graphical interaction styles.

Current graphical interfaces are directed through a task by a user. Nothing happens unless a user clicks on a screen based object or types from a keyboard. The user maintains control of the interaction, and can pause and restart the task at any time.

In contrast, speech interfaces tend to direct a user through a task. The user initiates the interaction, and thereafter the speech recognizer prompts the user for a response, i.e. asks the user to repeat a name, etc. and expects an almost immediate input. As mentioned above, speech recognizers for communications devices typically operate within a limited time window, usually within a few seconds after a speech prompt. Thus, the timing of the listening window of speech recognizer controls the requirement for the user to respond, to avoid an error or reprompting. Users often report feeling rushed when prompted to respond immediately after a beep or other speech prompt.

Natural language processors are known, which are on all the time, and thus can accept speech input at any time. However, these advanced speech recognizers require processing power of a network based system and are not yet widely used. Consequently, for most speech recognizers, there is a limited time window to respond after a speech prompt, and the user receives no indication of how long there is to respond.

In use of a multimodal interface, a user may feel particularly pressured after switching to a touch and/or graphical input/output mechanism, when the voice prompts remain active. A user who receives both graphical prompts and speech prompts, may be confused as to which is the appropriate mode to provide the next input, or may interpret dual prompts to be annoying or redundant.

In some systems, speech prompts may be manually turned on and off by the user to avoid this problem. However, this procedure introduces an intrusive, unnecessary step in an interface, necessitating that a user must remember to switch on the speech interface before providing speech input, and switch off before providing input by other modes. Furthermore, manual switching on and off of the speech interface does not address management of speech based error recovery mechanisms. For example, if a user switches from speech input to pen input, and the speech interface remains on, and has the same sensitivity to detected speech input, a cumbersome error recovery mechanism may be invoked in cases where the recognizer was unable to detect spoken input, or was unable to interpret the detected spoken input despite the presence of a specific pen input.

SUMMARY OF THE INVENTION

Thus, the present invention seeks to provide a device, system and method for dynamic adjustment of speech and audio prompts in response to a user's current interaction modality which avoids or reduces some of the above mentioned problems.

According to a first aspect of the present invention there is provided a communications device having a multimodal user interface offering a user a choice of input modalities, comprising a speech interface for accessing a speech recognizer, and a graphical user interface, and comprising means for dynamically switching between a foreground state of a speech interface and a background state of a speech interface in accordance with a users input modality.

For example, where the user may choose amongst a plurality of input modalities comprising speech input and non-speech input, such as tactile input, the device switches to a background state of the speech interface when a non-speech input mode is selected, and switches to a foreground state when speech input mode is selected.

Advantageously, in the foreground state of the speech interface, audio prompts and speech based error recovery are fully implemented. In the foreground state audio prompts may comprise speech prompts, earcons, or both earcons and speech prompts. Thus, the speech recognizer responds to a full vocabulary set and provides a full range of prompts to the user. In a background state speech prompts are replaced by a limited set of audio prompts, or earcons, and no speech based error recovery is implemented. In the background state of the speech interface, the speech recognizer therefore operates in a more conservative mode. For example the recognizer may respond only to a limited set of vocabulary, and not act on other sounds or speech inputs, and output only a limited set of audio prompts. Thus an appropriate set of audio prompts or speech prompts is selected depending on the user input modality. The user is then able to concentrate on non-speech interaction with the system by selected input/output modality, without distracting speech prompts.

Earcons are a limited or simplified set of audio prompts or recognizable sounds, in contrast to the speech prompts which include an appropriate vocabulary set.

Thus there is provided a device which automatically subdues the speech prompts when a user selects a non-speech input/output mechanism.

According to a another aspect of the present invention there is provided a method for dynamic adjustment of audio prompts in response to a users interaction modality in a communications system having a multimodal interface comprising a speech interface for accessing a speech recognizer and another interface, the method comprising:

after prompting a user for input and capturing input,
generating an input identifier associated with the user input modality,
determining the mode of user input modality and selecting a corresponding one of a foreground state and a background state of the speech interface.

Advantageously, when the users input modality is speech input, the method comprises selecting the foreground state of the speech interface. When the users input modality is non-speech input, for example tactile input, the method comprises selecting a background mode of the speech interface. Preferably, in the foreground state of the speech interface, audio prompts, including speech prompts and/or earcons, and speech based error recovery are fully implemented; and in the background state of the speech interface, speech prompts are replaced by earcons, and no speech based error recovery is implemented.

When the user's input modality comprises more than one input mode, for example both speech input and tactile input are received, the method comprises selecting an appropriate foreground or background state of the speech interface, for example according to a precedence system or selection system based on predetermined set of priorities associated with each input modality. Beneficially, the method provides for algorithms to determine appropriate selection of background or foreground state of the speech interface based on a sequence of previous inputs, or based on the expected needs of a user, and allowing for prediction of the most likely mode of the next input, according to the context of the application.

Thus the method provides for dynamically selecting alternative states for speech interfaces that represent a user's needs for speech prompts.

Another aspect of the invention provides software on a computer readable medium for carrying out these methods.

According to another aspect of the invention there is provided a system for dynamic adjustment of audio prompts in response to a users interaction modality with a communications device having a multimodal interface comprising a speech interface for accessing a speech recognizer, and another interface, comprising:

means for determining the mode of user input modality and selecting a corresponding one of a foreground state and a background state of the speech interface.

Appropriate speech and/or audio prompts are thus selected. This type of switching mechanism for selection between two states of the speech interface is particularly useful and applicable to hand held Internet access devices.

With the development of multimodal interfaces, i.e. those in which users have a choice between a variety of input/output sensory mechanisms, the invention therefore provides a way to manage the 'presence' of speech prompts in contexts where users choose to use a non-auditory/non-speech interaction. There is provided automatic and dynamic control of which mode of interaction is used or takes precedence during a user interaction.

By automatically adjusting the 'presence' of speech prompts in speech interfaces, in accordance with a users input modality choices, the resultant multi-modal interaction with a device is rendered more natural to the user, i.e. the user has greater sense of control, while still receiving an appropriate level of feedback from the system.

Thus, when the user selected a non-speech input/output mechanism, the speech recognizer switches to the background state.

In the background state of the interface, the speech recognizer is put into a conservative recognition state, in which the recognizer responds only to a very limited set of speech vocabulary, and response to extraneous noise, a cough, or other speech input is ignored. Thus, when the user selects keypad, pen or touch input the speech recognizer automatically goes into background state.

The speech recostazer will switch back to foreground state, when it detects and recognizes a valid speech from the user, or when activated by the use, or after the system issues speech prompts after which speech input is expected.

In hand held portable devices offering limited functionality, providing for switching between a foreground and background state of the speech interface, and selection of a background state offering more conservative audio prompts and speech recognition, may also have the benefit of conserving processing power required for operation of the speech interface, while allowing for full operation where foreground mode of the speech interface when required.

BRIEF DESCRIPTION OF THE DRAWINGS

The invention will now be described in greater detail with reference to the attached drawings wherein.

DETAILED DESCRIPTION OF THE INVENTION

Figure 1:
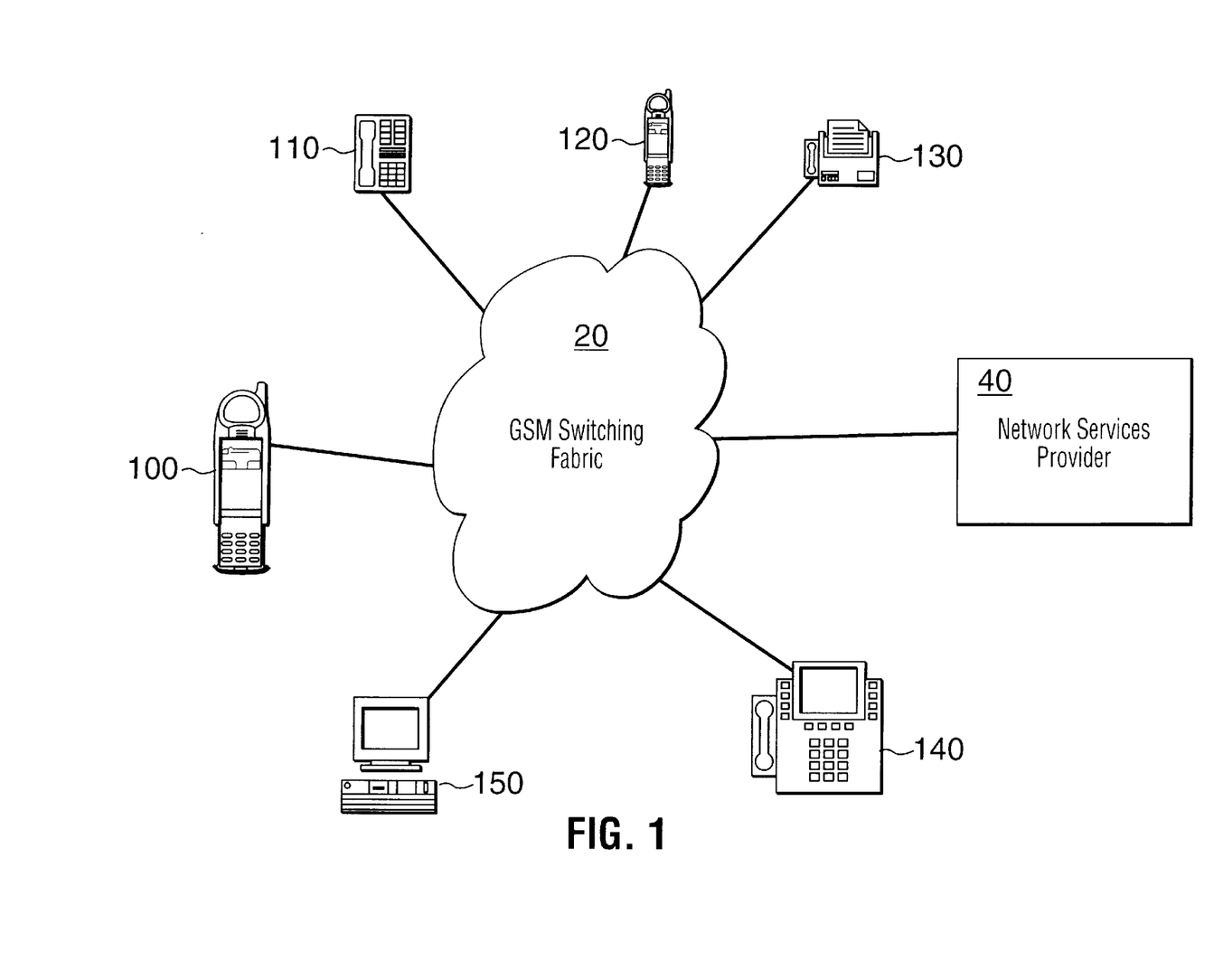
FIG. 1 shows a schematic block diagram of a communications network comprising a mobile telephone having a multitasking graphical user interface consistent with a first embodiment of the present invention.

A schematic block diagram of a communications network 10 is shown in FIG. 1 and represents a GSM switching services fabric 20 and a network services provider 40 associated with a plurality of communications terminals, for example a mobile telephone 100, and other wired or wireless communications devices and terminals represented schematically by units 110, 120, 130, 140 and 150.

Figure 2:
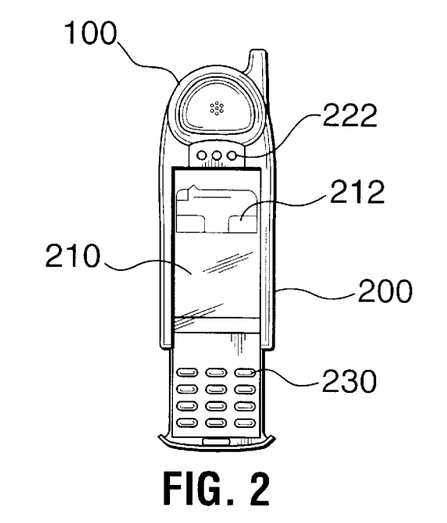
FIG. 2 shows schematically an enlarged diagram of a mobile telephone of FIG. 1.
Figure 3:
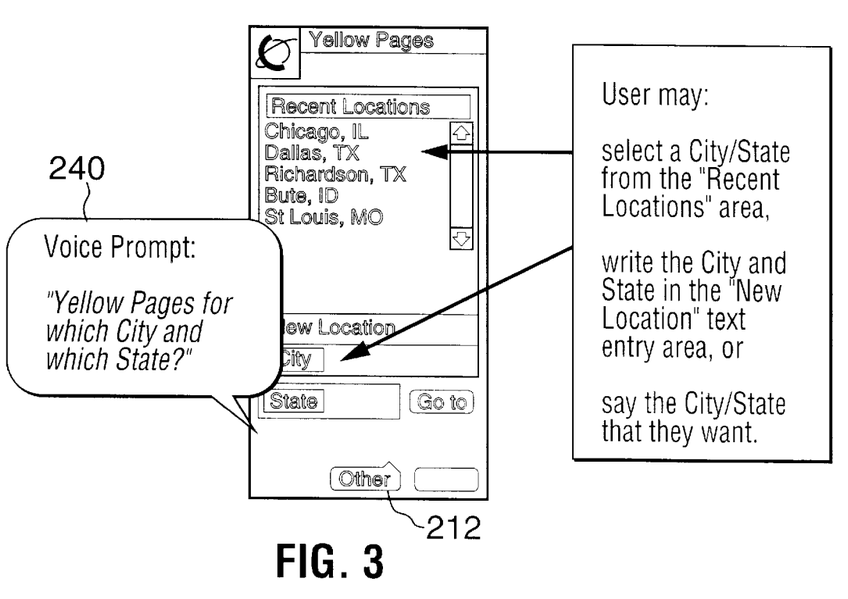
FIG. 3 shows further detail of part of a touch sensitive graphical user interface of the mobile telephone shown in FIG. 2 on an enlarged scale.
Figure 4:
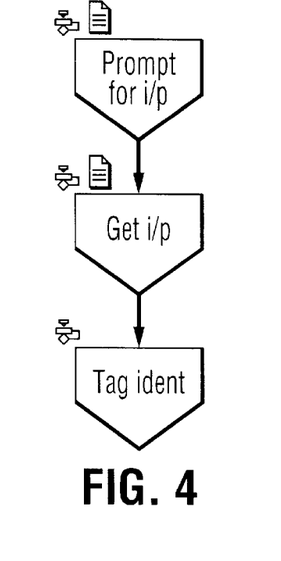
FIGS. 4 and 5 shows a high level flow chart setting out the steps associated with a method of for dynamically managing speech prompts according to an embodiment of the present invention, relating particularly to steps for processing user input a multimodal interface of a telecommunications device.

The wireless mobile phone 100 according to a first embodiment of the present invention is shown enlarged in FIGS. 2 and 3, is provided with a multitasking graphical user interface, similar to that described in copending US application Ser. No. entitled "Multimodal User Interface" filed Dec. 19, 1997, 08/992,630 to Smith and Beaton, which is incorporated herein by reference. This is a multi-modal user interface which provides a telecommunications system and methods to facilitate multiple modes of interfacing with users for example, using voice, hard keys, touch sensitive soft key input, and pen input. This system provides, e.g. for voice or key input of data, and for graphical and speech data output. Thus the user may choose to use the most convenient mode of interaction with the system and the system responds to input from all modes.

Thus, as shown in FIG. 2, mobile telephone unit 100 comprises a body 200 which carries a display screen 210 for the graphical user interface, which may include touch sensitive buttons 212; a conventional keypad 220 and other hard keys 222; speaker 240 associated with the speech interface to providing speech prompts as shown schematically by 230 to illustrate the various modes of interaction which may be selected by a user. Thus the unit provides for conventional key input, a graphical user interface which includes touch sensitive soft keys, and a speech interface comprising a speech prompt means to output audio prompts, and a speech recognizer to accept and interpret speech input.

The general operation of the mobile phone unit 100 and the network is described in more detail in the above mentioned U.S. patent application.

The device 100 according to a first embodiment of the present invention comprises a multimodal user interface including a speech interface for speech input and output and for accessing a speech recognizer, and non-speech interfaces for tactile input and graphical output, shown on an enlarged scale in FIG. 3. The device 100 also comprises means for dynamically switching between a background state of the speech interface and a foreground state of the speech interface in accordance with a users input modality choice.

Thus, for example a user may pick up the mobile phone, thus activating the unit, and turning on all default input/output modalities. The user may then select one of several modes of interaction with the unit. If for example the user initiates the interaction with a speech input, the speech interface is placed in the foreground state, i.e. it is turned on in the foreground state, or remains active in the foreground state.

On the other hand, if for example, the user uses the keypad, and or soft keys on the graphical user interface, to initiate interaction, e.g. to obtain a directory listing which is displayed on the screen, by using tactile input to scroll through the directory listing, the user may then choose to complete the task by issuing a speech command to initiate dialling. Simply by touching one of the keys and thus selecting non-speech input as the initial step, to obtain the directory listing on the display, the user places the speech interface in background state, where in the conservative state of the recognizer, any background noise, or conversation, coughing or extraneous sounds are unlikely to be recognized and acted upon by the recognizer. The user is therefore not bothered by unnecessary voice prompts, nor does the user have to be as careful not to make any extraneous noise. However once the user has obtained a particular directory listing on the screen and scrolled to the appropriate listing, the user may choose issue a speech command, i.e. 'dial John', by using one of the limited vocabulary set recognized by the recognizer in the background state, thus bringing the recognizer back into foreground state and allowing full voice recognition capability of the foreground state including speech prompting, and error recovery.

The user may thus proceed to interact via the speech interface until again inputting a command via the keys or tactile interface to initiate another process, thereby putting the speech interface back into background.

Introduction of adaptive speech recognizer parameters thus enable the recognizer to perform more conservative speech detection based on user input modality.

In the more conservative mode, the recognizer speech outputs are also muted, thus reducing the perceived presence of the recognizer functionality.

Multi-modal input buffers are provided that enable the system to wait until all user inputs have been received and interpreted. The wait time is dependent on the context of the application.

Error recovery mechanisms are provided that permit the system to return a list of choices that mirror the multi-modal matches that the system has detected. The method may be implemented using decision making algorithms to allow the system to decide which inputs are most likely given the current context, i.e. based on the sequence of input steps previously used, and prediction of the most likely selection to allow checking for input modality to take place is the most efficient manner. The method may be implemented using sensing algorithms to enable the system to detect that the user has changed input modality. This type of adaptive interface is particularly applicable and advantageous in contexts where non PC based devices are used to access IP services, i.e. devices with limited functionality and processing power in the device itself, or where there is simplified functionality of device which interacts with a network which provides more advanced functionality.

Enabling users to switch between automatically and non intrusively between input and output modalities in a natural way without overtly switching between modalities renders products easier to use. Enabling more natural interfaces to network based services is likely to become a competitive differentiator in the telecommunications terminals market.

Speech recognition may reside on the network or at the terminal device. The device and process of the embodiment thus facilitate speech access to information sources. It is believed to be particularly useful for hand held communications devices such as mobile phones and other specialized or portable terminals for information access and Internet based services, other than the example described in detail above, in which the device will prompt users for input, or inform users of the status of their interaction using a variety of graphical user interfaces, speech and auditory prompts, and correspondingly, users will be able to respond using touch, pen, keyboard, or speech.

A more detailed description of the method operation of a system implementing an adaptive interface as described above, will now be described with reference to a second embodiment of the invention, which relates to a Yahoo™ Yellow Page™ (YYP) directory application. The process will be described with reference to the flow charts shown in FIGS. 4 to 10.

In use of the YYP application, the user interacts with a communications device, which provides a speech interface and other interaction modalities including at least tactile (touch) interface and a graphical user interface, in a similar manner to that described in the first embodiment. The device may be for example a mobile phone or other communications device, for example a portable hand held Internet access device, supported by a network communications systems as described above. As mentioned above, the method is generally applicable to all systems that access speech recognition engines, whether these are implemented locally, or on a network server.

Firstly the system or device prompts the user for input, and receives input from the user by one of the number of possible interface modalities. The system generates an input identifier associated with the selected input sensory modality (FIG. 4) If more than one input is received within a predetermined time dependent on the users context, the user is presented with a choice of valid next steps.

Figure 5:
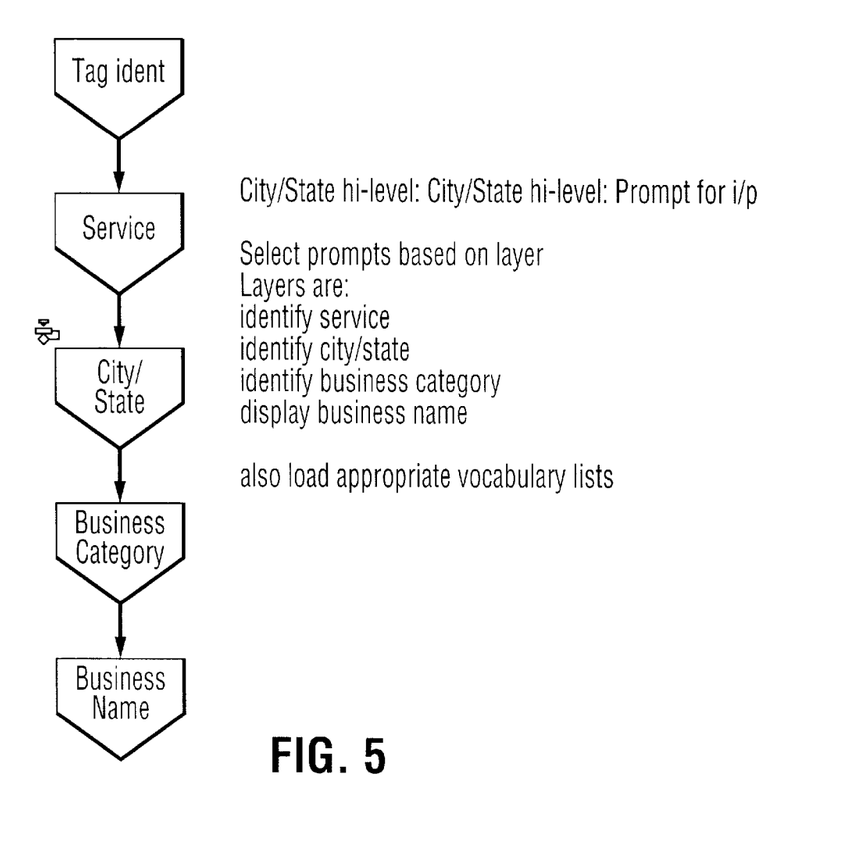

As indicated schematically in FIG. 5, the YYP application is a multi-layer application, and at each layer, prompts are selected associated with that layer, for example, the layers of this Yellow Pages directory are:

identify service,
identify city/state,
identify business category, and
display business name.

At each layer, the speech recognizer loads an appropriate vocabulary list with an appropriate set of prompts.

At the first layer, the appropriate vocabulary lists for the service layer are loaded.

Thus the first prompt will ask the user to 'identify the service'. On receiving input from the user, the system generates an input identifier associated with the respective type of each interface modality selected. After generating the input identifier based on the initial user input, the systems determines the mode of user input. If both speech and touch interfaces are used, then the system defers to touch, unless there a valid spoken vocabulary match. That is, the system detects and recognizes both inputs. In the latter case, the system treats the outcome as a confusion, and offers a choice to the user for the next input.

Figures 6, 6A:
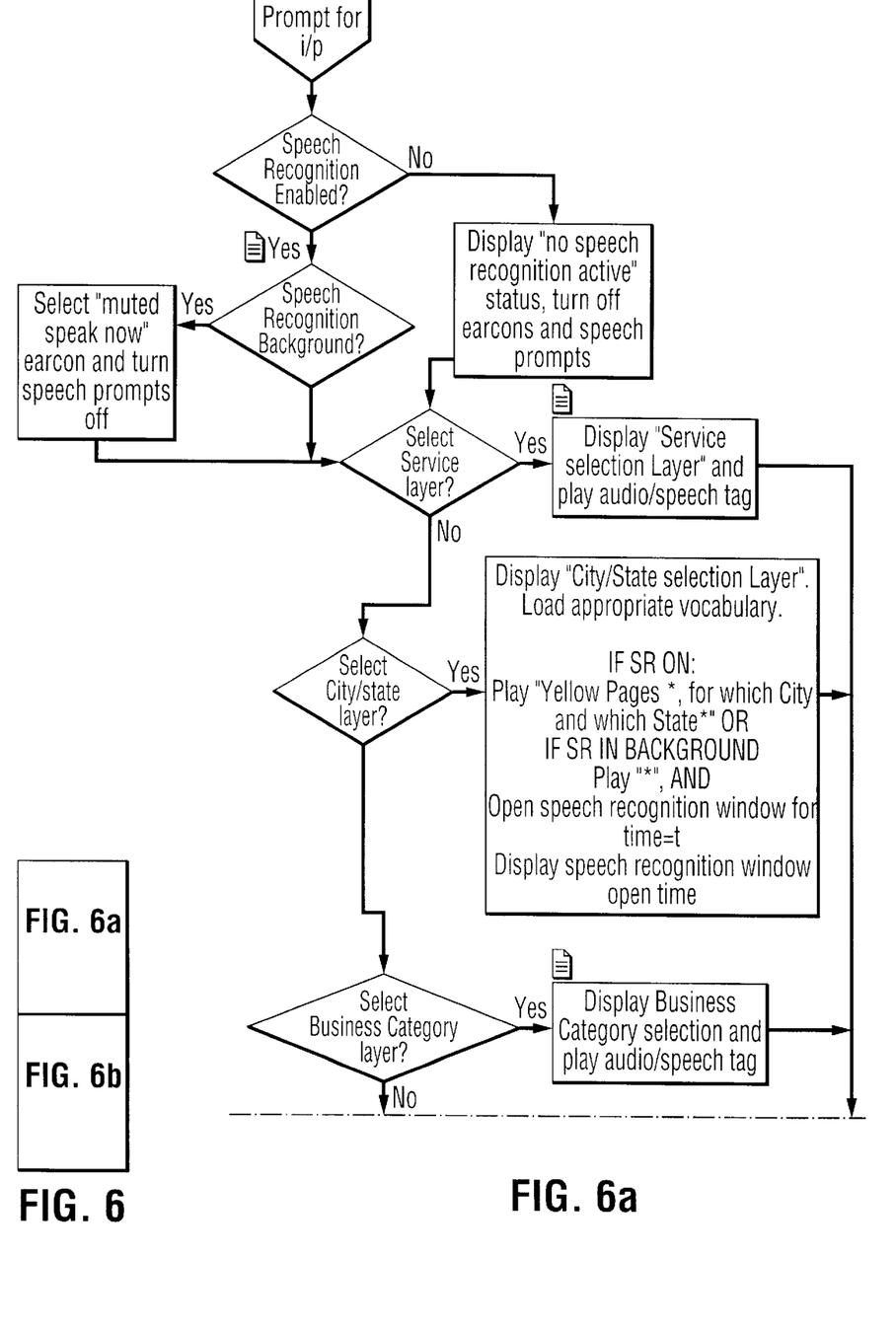
FIGS. 6 to 10 show additional flow charts setting out further details of steps of the method for dynamically managing speech prompts according to this embodiment.
Figure 6B:
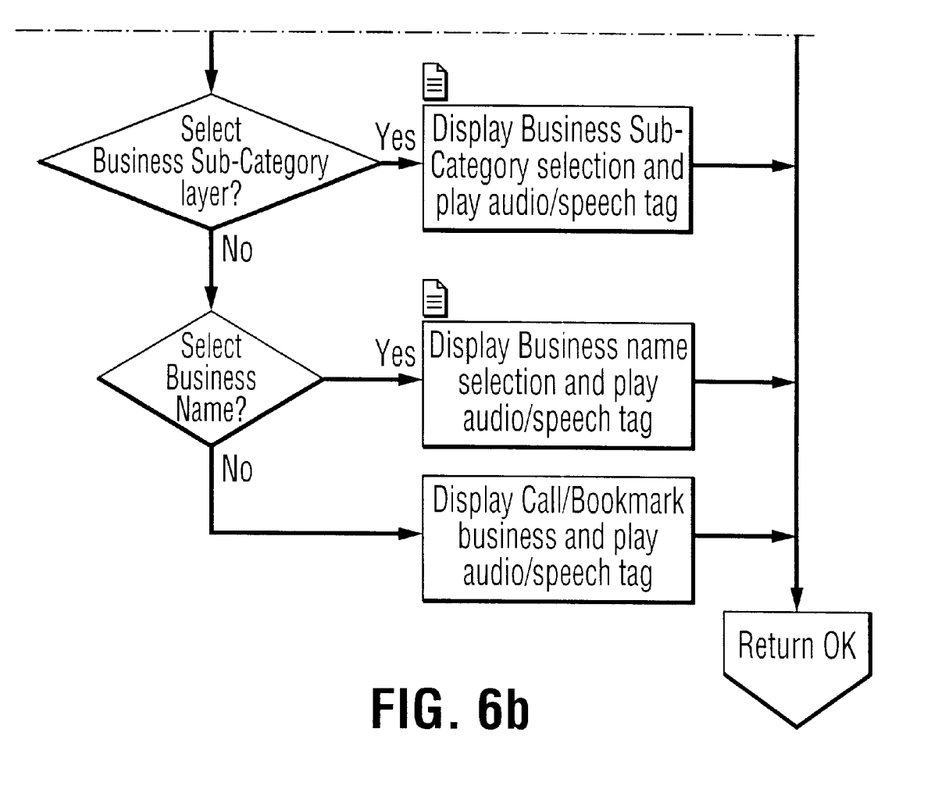

Following the steps in the flow chart of FIG. 6, after prompting for input, and determining the mode of input is not speech input, if speech recognition is enabled the speech interface will be switched into the background state.

Advantageously, the display should indicate the background state of the speech recognizer, i.e. by displaying an icon or message. In background state the recognizer windows are open at the usual time locations, i.e. the recognizer is turned on, but the recognizer will return a match only if there is a single highly probable spoken vocabulary match.

After confirmation that the speech interface is in background state, the systems prompts the user, via the graphical interface, to select a service layer.

In background state, the 'speak now' earcon is muted, and the speech prompts are turned off.

The background layer will also communicate a method of returning to selection of other services, a list of services available, and that the user may select a service by touching, or speaking, or, if appropriate, the service name.

In response to each selection input by the user, an appropriate next choice is displayed.

For example if the service layer is selected the display will show: 'Service selection layer' and play an audio speech prompt associated with the service selection layer.

Otherwise the system will offer other selections as indicated in the flow chart of FIG. 6, and check for selection of each of these options.

For example when prompting the user to select the city/state layer, if this selection is indicated, this city/state layer prompts will be displayed and the appropriate vocabulary will be loaded. As indicated in the flow chart, for example, if the speech recognizer is on, corresponding speech prompts will be played.

If the speech recognizer is in background, an earcon e.g. a beep indicated by (*), will be played, to indicate that speech input will now be accepted, and the speech recognition window is opened.

Subsequently, the user will be offered selections for business category layer, business sub category layer and business layer in sequence. If one of these layers is selected, a selection appropriate to the layer will be displayed and an audio or speech tag will be played, as appropriate.

For example, if the user selects the business category layer, the display will indicated that the user can write a business category, select a category from those displayed, or speak a business category, within the speech recognition time window.

On selection of the business sub-category layer, a user will select a business sub-category from those displayed by touch, or speak a selection from the business sub category within the time recognition window.

The user will be able to see the context of the sub-categories on the display.

The user will also see a way of selecting to go up the business category hierarchy or go back to the city/state selection or select another city/state.

The city/state will then be displayed.

On selection of the business name, the display indicates the business names associated with the users business category selection. The business names will be listed under the leaf match.

When speech recognition is enabled, the input mode is checked to determine whether the speech recognition should be on. When there is a prompt for input, and speech recognition is not recognized, the screen displays a prompt to select or write the next request.

Each time an input is received and an identifier is generated, the respective recognizer associated with the interface will seek a match. Where there is more than one match, a token will be returned for each match. The system must then determine which mode of input takes precedence.

Figure 7:
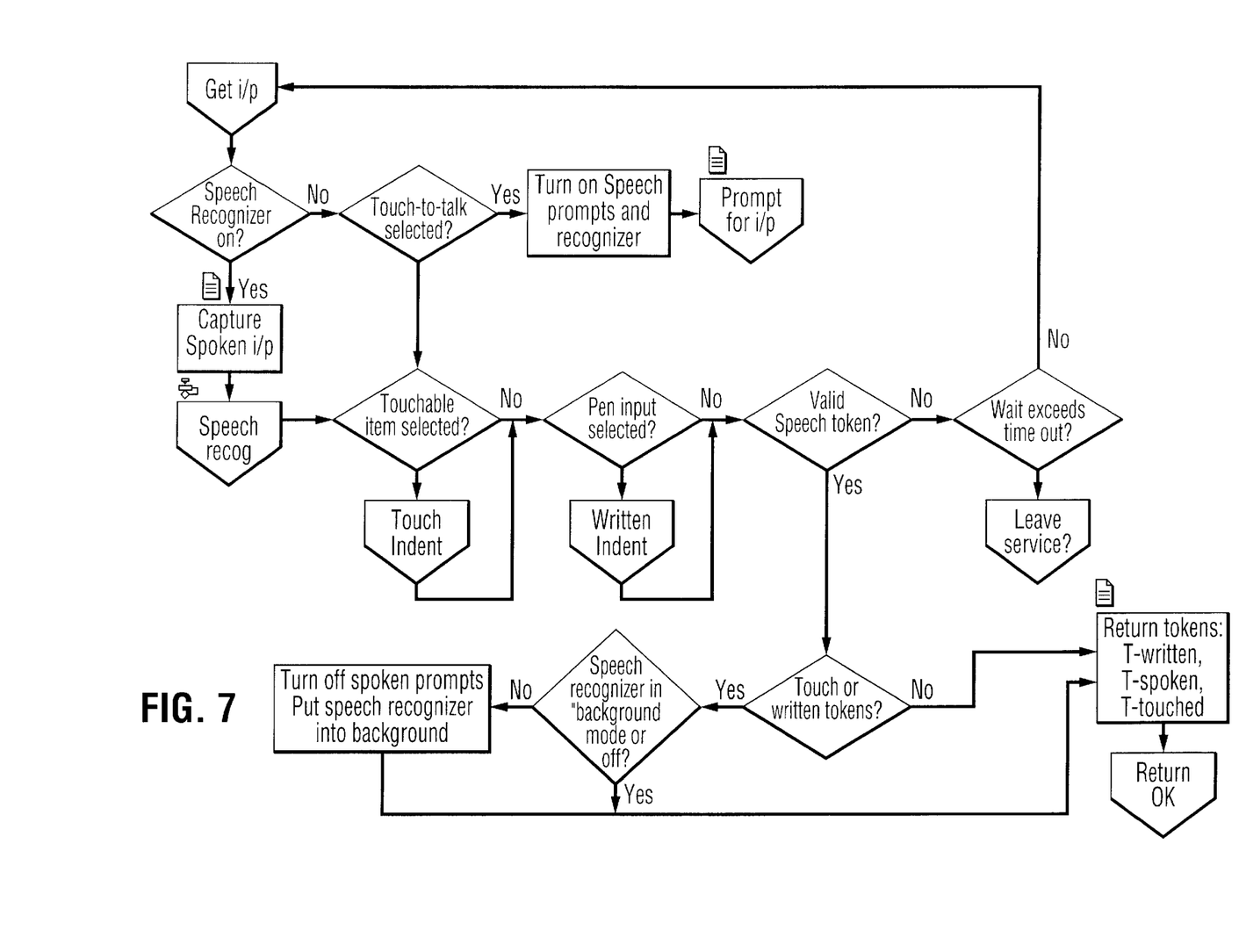

With reference to the flow chart in FIG. 7 which shows one embodiment of a sequence of method steps for determining the various modes of input so that the system selects the appropriate modality for the next level of prompts, that is, either turn on speech prompts, or issue graphical prompts.

For, example as illustrated, the system gets input and checks whether the speech recognizer is on. If the speech recognizers on, the spoken input is captured.

Similarly, the system also checks for input using other input modalities. Inputs for each mode are captured, and as the flow chart shows identifiers for written, spoken and touch input are generated, the input is processed and tokens representing a match for each input are processed by a sequence of steps shown in FIG. 7.

Figure 9:
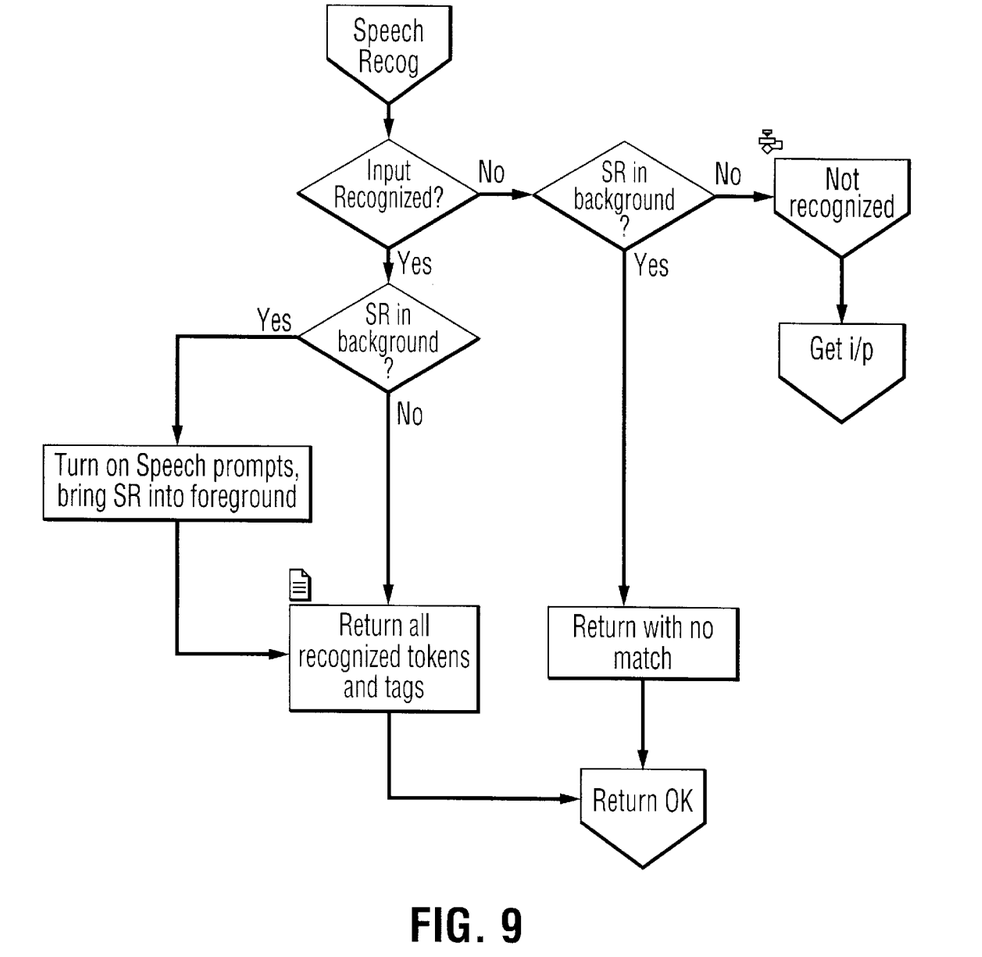

The flow chart in FIG. 9 shows a sequence of steps for recognizing input when there is speech input and when the speech recognizer is in background state. The flow chart in FIG. 10 sets out steps for determining time out failures and re-prompting the user for further input where speech input has not been understood, in other words a method for error recovery.

As shown in the flow chart of FIG. 7, the input is obtained, and the systems determines if the speech recognizer is on. If it is on, the speech input is captured, and the next prompt is provided by the speech interface. Alternatively if the speech recognizer is off, the system determines whether a 'touch-to-talk' option is selected i.e. receiving input from a touch sensitive button on the display. If yes, the speech interface is turned back on, into foreground state and the system issues a speech prompt for input. This option provides the user with one way of turning the speech prompts back on.

The system then queries, in turn, if a touchable item, a pen input, or a valid speech input is received. For each that is identified or matched, an valid token is generated. If none are generated and the wait for input exceeds the time out, then the system either re-prompts or for example, on the second attempt if no valid input is received, leaves the service layer and returns to another layer.

If valid tokens are returned for more than one mode, i.e. touch input, pen input and speech input, the system again determines if the speech recognizer is in background or foreground state, switches the speech recognizer in background state, returns tokens for each mode, and returns an OK to proceed.

Figures 8, 8A:
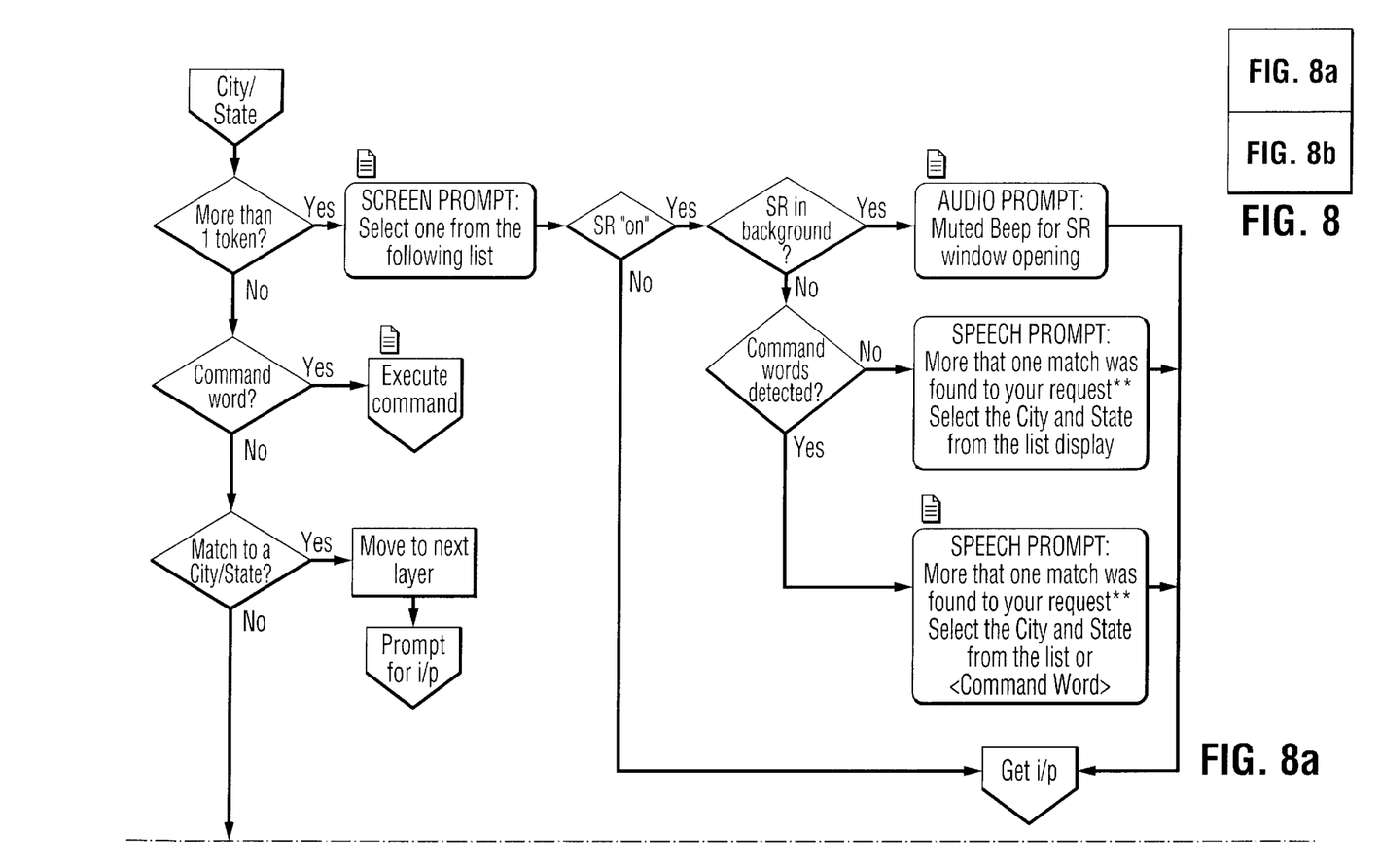
Figure 8B:
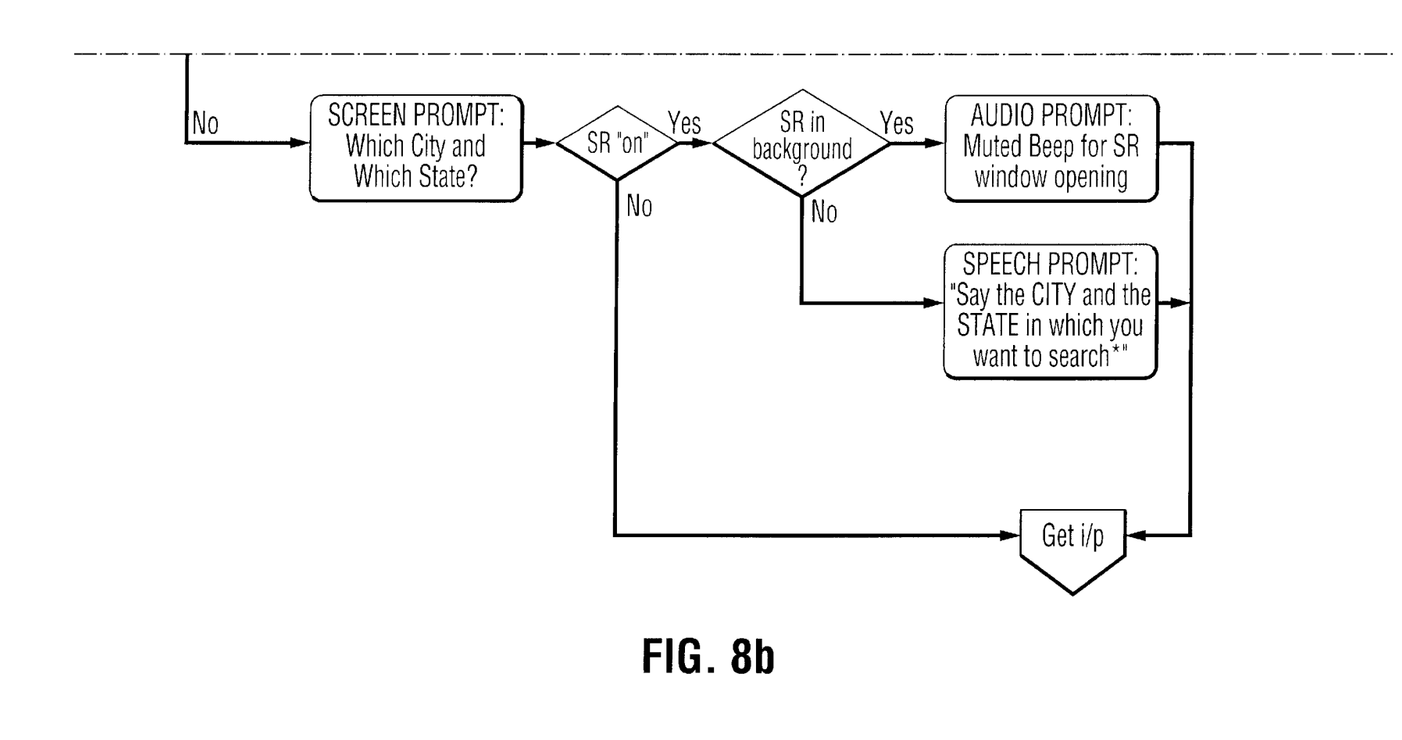

As shown in the flow chart of FIG. 8, if there is more than one token returned, the system provides a subsequent screen prompt for input, and captures input by the appropriate mode, depending on whether the recognition window of the speech recognizer is open or closed, and whether the speech interface is in background state or foreground state.

If only one token is returned, the systems seeks a command word, i.e. one of a limited vocabulary set, recognized by the speech recognizer, which direct the system how to proceed.

QUIT—quits yellow pages and returns to system idle

RETURN TO YELLOW PAGES—quits yellow pages and returns to service selection

SELECT OTHER SERVICE—returns to prompt for input at the same layer

NONE OF THESE—returns to the top of the yellow pages and requests city and state If a command word is received, the system executes the command, or otherwise determines if there is a match to city/state to allow a move to the next layer, when there is a further prompt for input.

Otherwise the systems retains the screen prompt for which city and state. The system then queries if the speech recognizer is on or off (i.e. whether the speech recognition window is open or closed). If the speech recognizer is off, the system gets input, and if speech recognizer is in background then issues an audio prompt, e.g. a muted beep to indicate the speech recognizer window opening, or if speech recognizer is in foreground issues a speech prompt, i.e. 'Say the city and the state in which you want to search'.

After capturing input, if more than one token is returned, then the screen prompts for speech recognizer on. If the speech recognizer is off, the system will get input from other modes, if the speech recognizer is in background an audio prompt Muted beep for speech recognizer window opening is given. If the speech recognizer is in foreground, then the system queries if command words are detected. Again the relevant set of command words as mentioned above direct the system how to proceed if there is ambiguity of this sort.

Thus these commands, for example, direct the system to reset or go to another layer. If no command words are detected, a speech prompt is given "More than one match was found for your request, select the city and state from the list displayed."

If the command words were detected, a speech prompt is given "More than one match was found to your request. Select the city and state from the list or <command word>" and further input will be sought.

When the speech recognizer is on, the input is accepted and a determination is made whether the input is recognized. If no, and SPEECH RECOGNIZER is not in background all recognized tokens and tags are returned.

If yes and the SPEECH RECOGNIZER is in background, first the speech prompts are turned on, and then all recognized tokens and identifiers are returned.

If the input is not recognized and if the speech recognizer is not in background state, further input will be prompted and sought. If SPEECH RECOGNIZER is in background there will be a return with no match.

Figure 10:
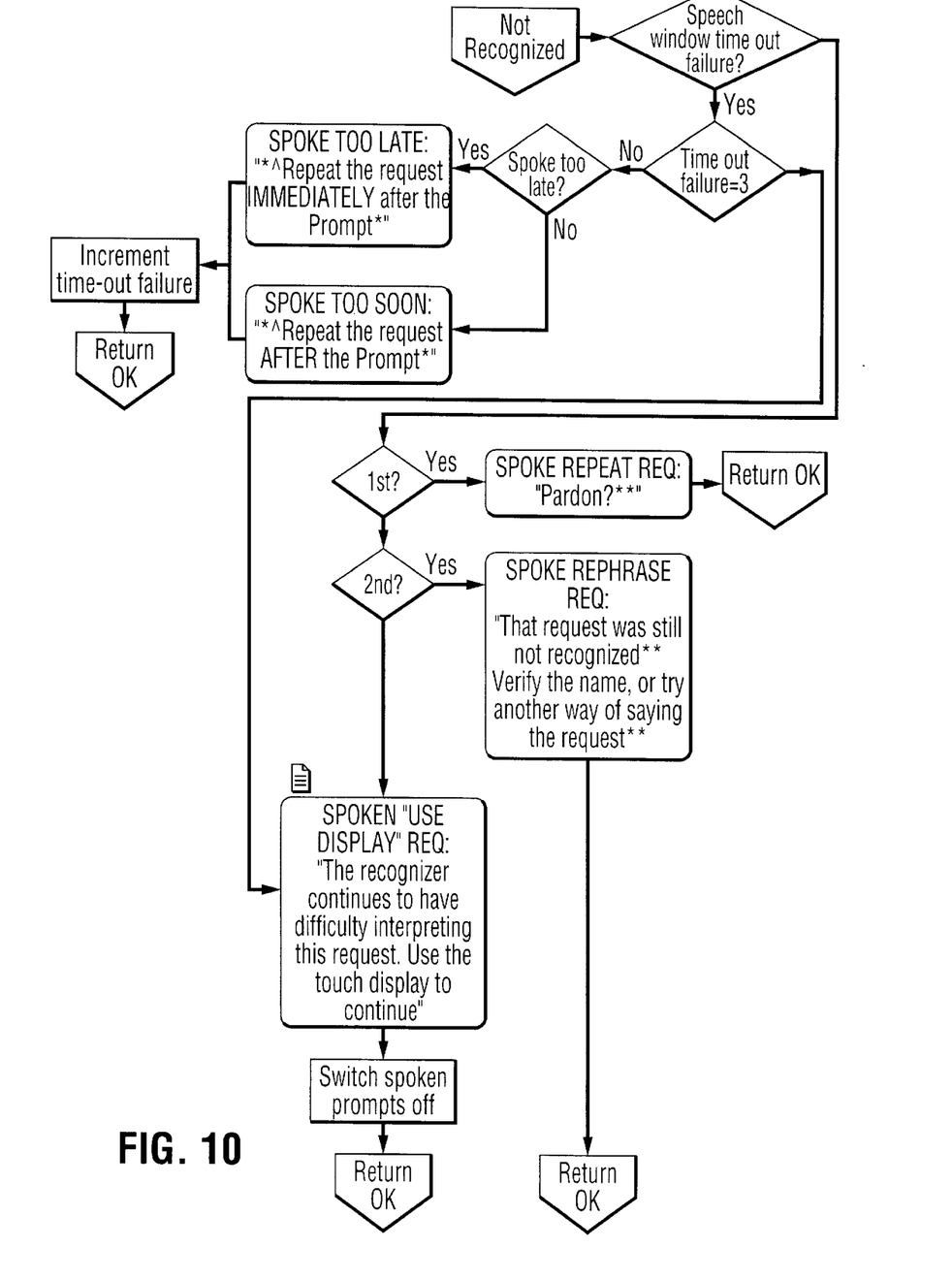

The flowchart in FIG. 10 sets out an example of an error recovery route for a time out failure because input was received to late or too early, and for input that is simply not recognized.

When speech input is detected, it is preferable that there is also a graphic display which reinforces the open speech recognition window and displays visual feedback of 'sound detected'.

When the screen displays all complete city/state matches and command words that were matched, the screen also displays a prompt 'Make choices'.

If there is a speech match to a city only, all valid city/state combinations are returned, even if there was only a city match. The user is then invited to choose the appropriate city/state combination.

While the flowcharts set out specific methods for determining priority of input modes, identifiers and tokens, and for error recovery, it will be apparent that these represent only one implementation of such methods by way of example only and with reference to one specific directory application exemplifying management of speech prompts by switching between background and foreground states of a speech recognizer.

Other applications using telecommunications devices with multimodal user interfaces also benefit from the use of dynamic management of a speech interface and speech prompts as described above.

The embodiments were described with reference to a network service based on a GSM switching network, and a architecture based on a Java telephony application interface, as described in the above referenced copending application "Multimodal Interface" to Smith and Beaton. The services described herein are preferably implemented using a network server as described in copending U.S. patent application entitled 'Server for handling multimodal information' to Henry Pasternak, filed concurrently herewith, and which in incorporated herein by reference. This server was developed for handling information in different modal forms associated with respective input/output modalities of a multimodal interface, and may be used to implement the systems and methods described herein.

Nevertheless, the device and methods described herein may be implemented on other systems capable of supporting multimodal interfaces, and are intended to be substantially platform independent.

Thus, although specific embodiments of the invention have been described in detail, it will be apparent to one skilled in the art that variations and modifications to the embodiments may be made within the scope of the following claims.

What is claimed is:

1. A communications device having a multimodal user interface offering a user a choice of input modalities, comprising a speech interface for accessing a speech recognizer, and a graphical user interface, and comprising means for dynamically switching between a foreground state of a speech interface and a background state of a speech interface in accordance with a users input modality.

2. A device according to claim 1 wherein, in the foreground state audio prompts and full speech based error recovery are implemented.

3. A device according to claim 2 wherein audio prompts comprise one of speech prompts, earcons, and both speech prompts and earcons.

4. A device according to claim 1 wherein in the background state audio prompts comprising earcons, and no speech based error recovery are implemented.

5. A device according to claim 3 wherein in the background state speech prompts are replaced by earcons, and no speech based error recovery are implemented.

6. A device according to claim 1 wherein,
in the foreground state, audio prompts comprising one of speech prompts, earcons, and both speech prompts and earcons are implemented and full speech based error recovery is implemented,
and in the background state, audio prompts comprising earcons replacing speech prompts, and no speech based error recovery are implemented.

7. A device according to claim 6 wherein the speech prompts are automatically subdued when a user selects a non-speech input modality.

8. A device according to claim 1 wherein the device also includes at least one of keypad interface, a tactile interface and a pen input interface.

9. A device according to claim 1 comprising a mobile telephone.

10. A device according to claim 1 comprising a hand held Internet communication device.

11. A device according to claim 1 wherein the speech recognizer is accessed on a network system.

12. A device according to claim 1 wherein the speech recognizer is provided by the device.

13. A method for dynamic adjustment of audio prompts in response to a users interaction modality in a communications system having a multimodal interface comprising a speech interface for accessing a speech recognizer and another interface, the method comprising:
after prompting a user for input and capturing input,
generating an input identifier associated with the user input modality,
determining the mode of user input modality and selecting a corresponding one of a foreground state and a background state of the speech interface.

14. A method according to claim 13 comprising when the users input modality is speech, selecting the foreground state of the speech interface,
and when the users input modality is non-speech, selecting a background mode of the speech interface.

15. A method according to claim 14 wherein
in the foreground state of the speech interface,
implementing audio prompts comprising one of speech prompts, earcons, and earcons and speech prompts, and implementing full speech based error recovery, and,
in the background state of the speech interface, implementing audio prompts comprising earcons replacing speech prompts, and implementing no speech based error recovery.

16. A method according to claim 14, wherein in a foreground state, audio prompts include speech prompts.

17. A method according to claim 13 wherein when the user's input modality comprises more than one input mode, the method comprises selecting an appropriate foreground state or background state of the speech interface according to a precedence system.

18. A method according to claim 13 wherein when the user's input modality comprises more than one input mode, the method comprises selecting an appropriate foreground state or background state of the speech interface according to a context of the application.

19. A method according to claim 13 wherein when the user's input modality comprises more than one input mode, the method comprises selecting an appropriate foreground state or background state of the speech interface according to a selection system.

20. A method according to claim 13 wherein when the user's input modality comprises more than one input mode, the method comprises selecting an appropriate foreground state or background state of the speech interface based on predetermined set of priorities associated with each input modality.

21. A method according to claim 13 wherein the method comprises determining an appropriate selection of the background or foreground state of the speech interface based on a sequence of previous user inputs.

22. A method according to claim 13 wherein selection of the background or foreground state of the speech interface is based on the expected needs of the user.

23. A method according to claim 13 wherein when the user selected a non-speech input/output mechanism, switching the speech interface to the background state.

24. A method according to claim 13 wherein in the background state a speech recognizer of the speech interface is put into a conservative recognition state, in which the recognizer responds only to a very limited set of speech and audio input.

25. A method according to claim 23 wherein the background state is selected until speech input is recognized by the recognizer and then switching from the background state to the foreground state of the interface.

26. Software on a computer readable medium for carrying out a method for dynamic adjustment of speech prompts in response to a users interaction modality in a communications system having a multimodal interface comprising a speech interface for accessing a speech recognizer, and another interface, the method comprising:

after prompting a user for input and capturing input, generating an identifier associated with the user input modality, determining the user input modality and selecting a corresponding one of a foreground state and a background state of the speech interface.

27. A system for dynamic adjustment of audio prompts in response to a users interaction modality with a communications device having a multimodal interface comprising a speech interface for accessing a speech recognizer and another interface, comprising: means for determining the mode of user input modality and selecting a corresponding one of a foreground state and a background state of the speech interface.

28. A system according to claim 27 wherein the foreground state of the speech interface provides audio prompts comprising one of speech prompts, earcons, and earcons and speech prompts, and provides full speech based error recovery, and in the background mode of the speech interface provides audio prompts comprising earcons replacing speech prompts, and provides no speech based error recovery.

29. A system according to claim 28, wherein in a foreground state, audio prompts include speech prompts.

30. A system according to claim 27 comprising means for selecting an appropriate foreground state or background state of the speech interface according to a precedence system when input is captured for multiple input modalities.

31. A system according to claim 27 comprising means for selecting an appropriate foreground state or background state of the speech interface based on a context of the application when input is captured for multiple input modalities.

32. A system according to claim 27 comprising means for selecting an appropriate foreground state or background state of the speech interface according to a selection system when input is captured for multiple input modalities.

33. A system according to claim 27 comprising means for selecting an appropriate foreground state or background state of the speech interface based on predetermined set of priorities associated with each input modality when input is captured for multiple input modalities.

34. A system according to claim 27 comprising means for selecting an appropriate foreground state or background state of the speech interface based on a sequence of previous user inputs.

35. A system according to claim 27 comprising means for selecting an appropriate foreground state or background state of the speech interface based on the expected needs of the user.

* * * * *